United States Patent [19]

Shu

[11] Patent Number: 5,690,181
[45] Date of Patent: Nov. 25, 1997

[54] TOOL HANDLE MOUNTING STRUCTURE FOR GARDEN TOOLS

[76] Inventor: Chun-Li Shu, No. 426, Tou-Yuan E. Rd., Ho-Feng Village, Pi-Tou Hsiang, Chang-Hua Hsien, Taiwan

[21] Appl. No.: 735,269

[22] Filed: Oct. 22, 1996

[30] Foreign Application Priority Data

Aug. 15, 1996 [CN] China ................................ 85212453

[51] Int. Cl.⁶ .......................................................... A01B 1/22
[52] U.S. Cl. ............................................ 172/378; 172/371
[58] Field of Search .......................... 172/371, 372, 172/378, 380, 381; 16/114 R, 110 R, 113; 403/320, 316

[56] References Cited

U.S. PATENT DOCUMENTS

| | | |
|---|---|---|
| 4,183,694 | 1/1980 | Dent ................................ 403/320 |
| 4,232,422 | 11/1980 | Fellmann ........................ 172/378 X |
| 4,261,599 | 4/1981 | Streed ............................. 403/320 X |
| 4,875,639 | 10/1989 | Zurchen ......................... 403/316 X |
| 5,477,929 | 12/1995 | Kenyon et al. ................. 172/371 X |
| 5,579,848 | 12/1996 | Hsu ................................... 172/378 |

*Primary Examiner*—Terry Lee Melius
*Assistant Examiner*—Robert Pezzuto
*Attorney, Agent, or Firm*—Bacon & Thomas

[57] ABSTRACT

A tool handle mounting structure including a tool head having a fixed coupling cap, a handle having a tubular front end fastened to the coupling cap by a screw joint, and a sleeve fixedly mounted around the tubular front end to hold a sliding lock, wherein when the sliding lock is moved forwards after the handle is coupled to the coupling cap of the tool head, the handle is locked; when the sliding lock is moved backwards, the handle is unlocked, and can be turned reversely and disconnected from the coupling cap of the tool head.

1 Claim, 4 Drawing Sheets

TOOL HANDLE MOUNTING STRUCTURE FOR GARDEN TOOLS

BACKGROUND OF THE INVENTION

The present invention relates to gardening tools, and relates more particularly to the tool handle mounting structure of a gardening tool which permits the handle to be quickly fastened to the tool head, and releasably locked by a sliding lock.

A variety of gardening tools including spades, dibbles, rakes, mattocks, etc., are used in nursery gardens for different purposes. Regular gardening tools are commonly made in set. A gardening tool set includes several gardening tools of the same kind but respectively equipped with a different length of handle for use in different conditions. However, it is not economic to prepare several gardening tools for the same purpose just for use in different conditions. In order to eliminate this problem, gardening tools with replaceable handles are designed, and a screw joint is commonly employed for the connection between the handle and the tool head. Because the handle is fastened to the tool head through a screw joint, the handle tends to be turned relative to the tool head during operation, causing the tool head to disconnect from the tool handle.

SUMMARY OF THE INVENTION

The present invention has been accomplished to provide a tool handle mounting structure which eliminates the aforesaid problems. It is the main object of the present invention to provide a tool handle mounting structure which permits the handle to be quickly coupled to the tool head and, which locks the handle in position when installed. According to the preferred embodiment of the present invention, the tool handle mounting structure is comprised of a tool head having a fixed coupling cap, a handle having a tubular front end fastened to the coupling cap by a screw joint. The tubular front end of the handle is mounted with a sleeve, which holds a sliding lock. When the sliding lock is moved forwards into a locating groove on the outside wall of the coupling cap after the handle is coupled to the coupling cap of the tool head, the handle is locked. On the contrary, when the sliding lock is moved backwards, the handle is unlocked, and can be turned reversely and disconnected from the coupling cap of the tool head.

DETAILED DESCRIPTION OF THE PREFERRED EMBODIMENT

Figure 1:
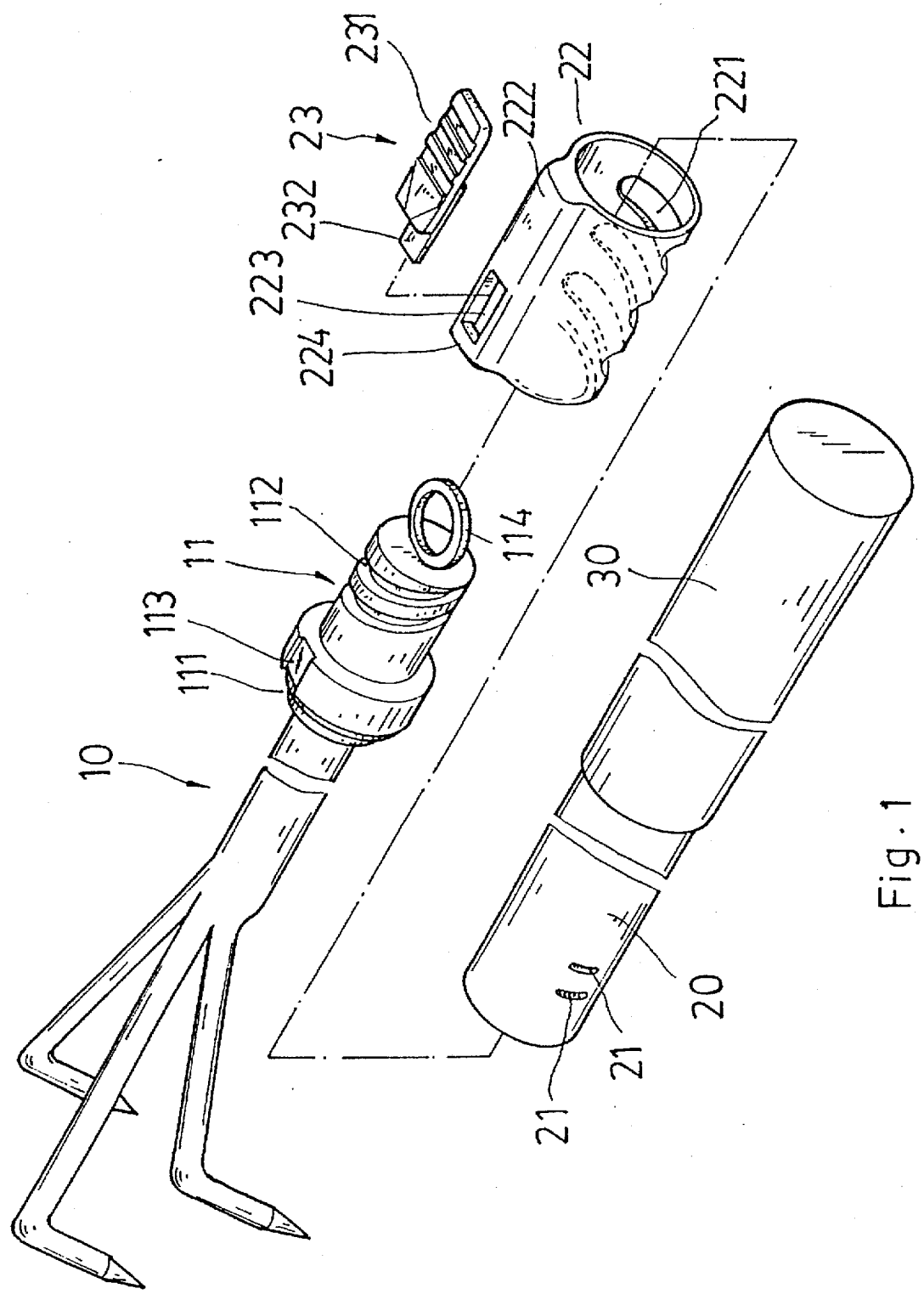
FIG. 1 is an exploded view of a tool handle mounting structure according to one embodiment of the present invention.
Figure 2:
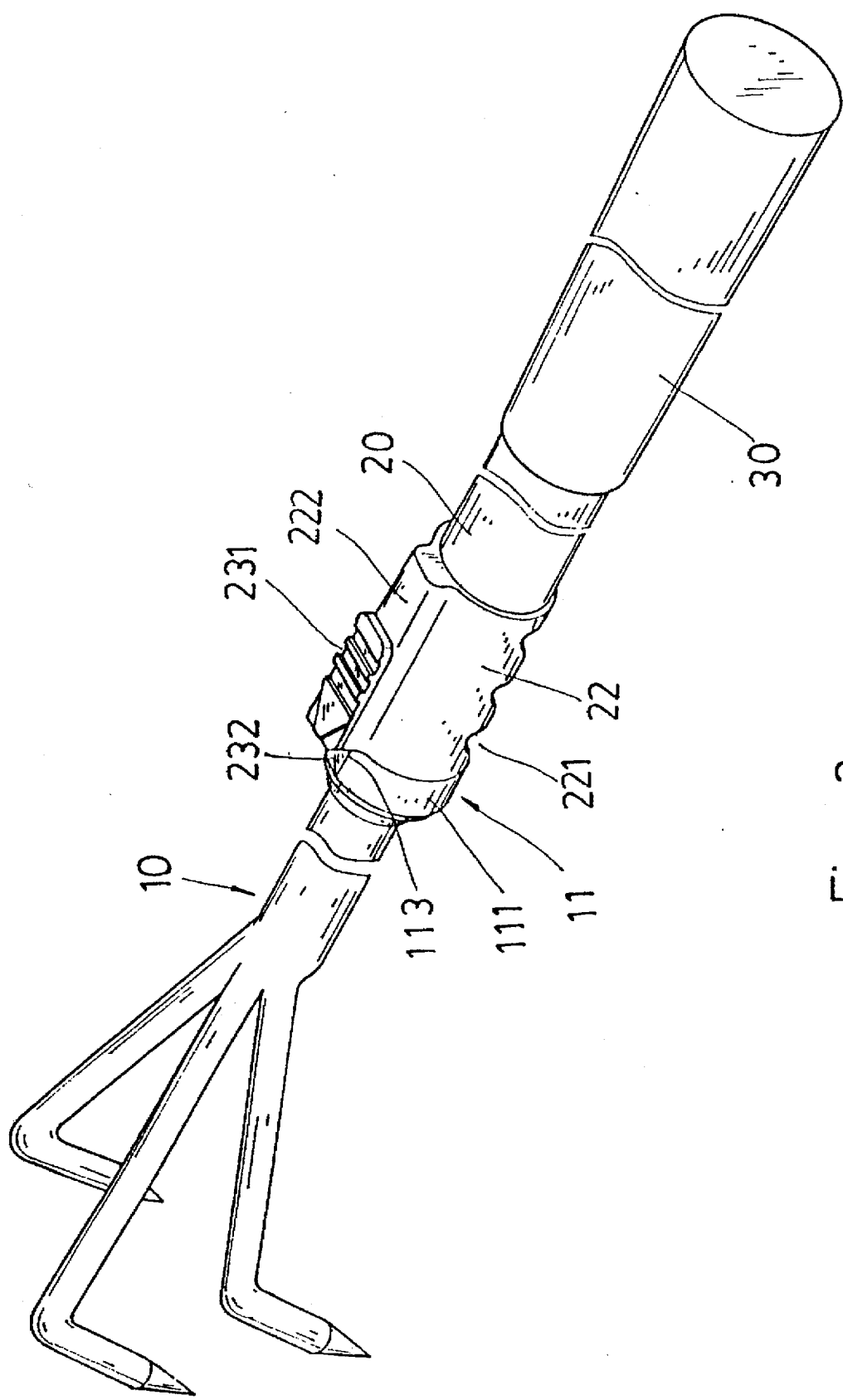
FIG. 2 is an assembly view of FIG. 1.

Referring to FIGS. 1 to 3, a tool handle mounting structure in accordance with the present invention is generally comprised of a tool head 10, and a handle 20. The tool head 10 is mounted with a coupling cap 11 adapted for coupling to the handle 20. The coupling cap 11 is a cylindrical cap having a mounting section 111 at one end fixed to the tool head 10, and an externally spirally grooved coupling section 112 at an opposite end for coupling to the handle 20. The outer diameter of the mounting section 111 has a stepped profile raised in direction toward the coupling section 112. A longitudinal locating groove 113 is formed at the biggest outer diameter of the mounting section 111. A ring 114 is fixedly connected to the free end of the coupling section 112 for hanging. The handle 20 has a hollow cylindrical shape, a plurality of threads radially raised from the inside wall near one end (namely, the front end which is adapted for coupling to coupling cap 11 at one end of the tool head 10) and adapted for engaging the spirally grooved outside wall of the coupling section 112 of the coupling cap 11, and a grip 30 at an opposite end (namely, the rear end remote from the too head 10). A sleeve 22 is mounted around the front end of the handle 20. The sleeve 22 has a plurality of radial oblong slots 221 axially spaced from one another at one side, a longitudinal track 222 raised from the periphery at one side opposite to the oblong slots 221, a longitudinal sliding slot 223 through the longitudinal track 222, a bridge 224 in front of the longitudinal sliding slot 223, a sliding lock 23 mounted in the longitudinal sliding slot 223. The radial oblong slots diminish material consumption, reinforce the structural strength of the sleeve 22, and make the sleeve 22 more attractive. The sliding lock 23 comprises a push plate 231 moved along the longitudinal track 222 of the sleeve 22, and a locking tongue 232 extended forwards from the push plate 231 at a different elevation and moved in the longitudinal sliding slot 223 under the bridge 224.

Figure 3A:
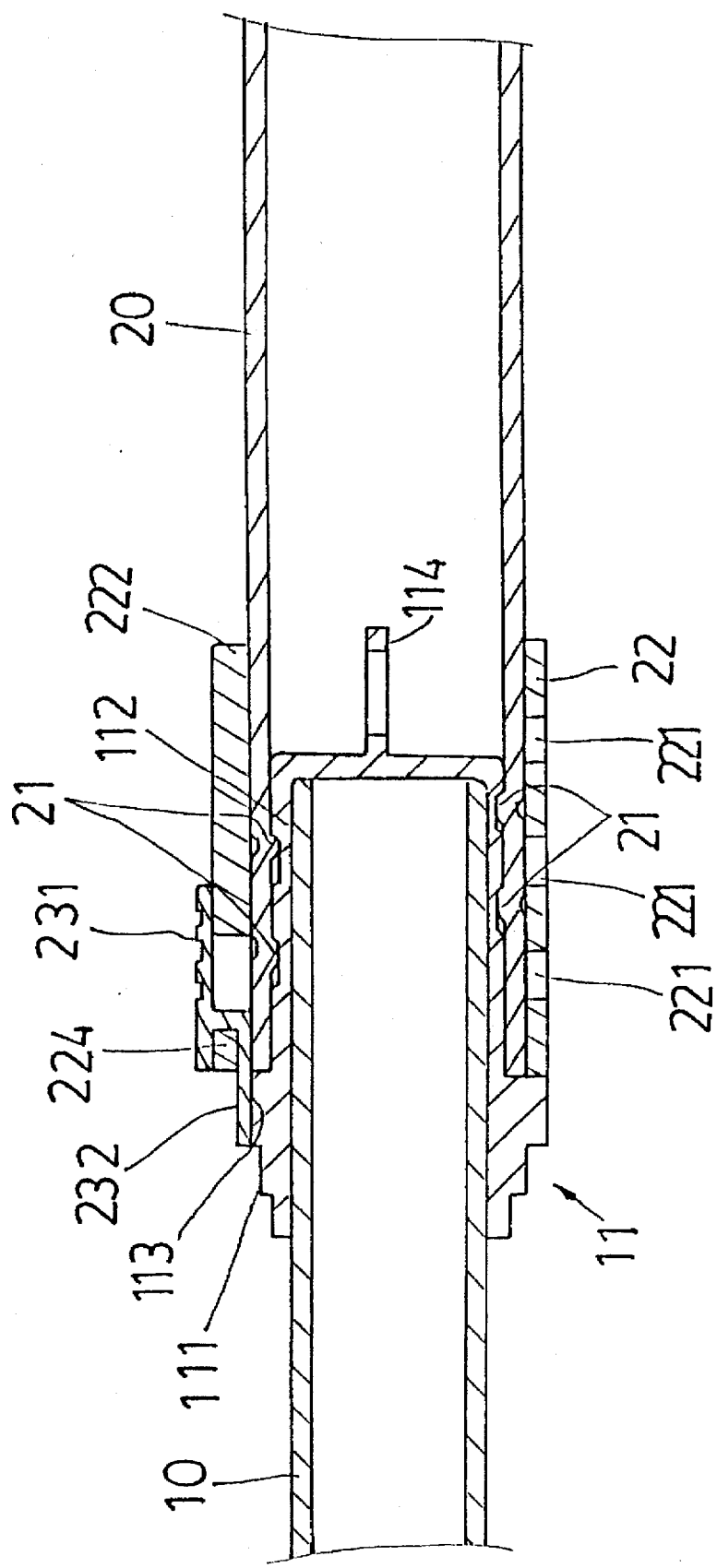
FIG. 3A is a longitudinal view in section of a part of FIG. 2 in an enlarged scale, showing the sliding lock locked; and, FIG. 3B is similar to FIG. 3A but showing the sliding lock unlocked.
Figure 3B:
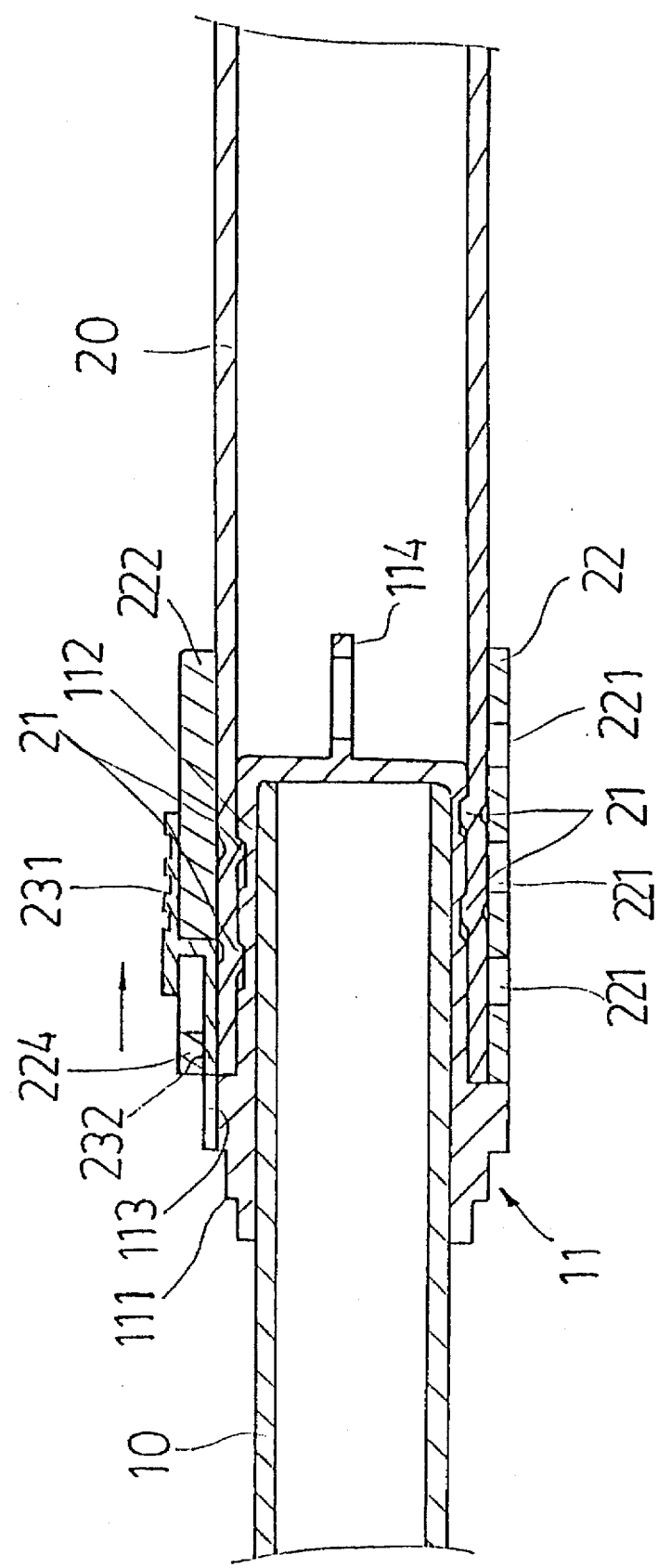

Referring to FIGS. 3A and 3B, when the front end of the handle 20 is fitted into the sleeve 22, the front end of the handle 20 is coupled to the coupling cap 11 by threading the threads 21 onto the spirally grooved outside wall of the coupling section 112 of the coupling cap 11. When coupled, the push plate 231 of the sliding lock 23 is pushed forwards to force the longitudinal tongue 232 into the longitudinal locating groove 113 to stop the sleeve 22 and the handle 20 from rotary motion relative to coupling cap 11, and therefore the handle 20 and the tool head 10 are locked. When the push plate 231 is pushed backwards to disengage the locking tongue 232 from the longitudinal locating groove 113, the sleeve 22 and the handle 20 are unlocked and can be turned relative to the coupling cap 11 in the reversed direction, and therefore the handle 20 can be disconnected from the tool head 10.

While only one embodiment of the present invention has been shown and described, it will be understood that various modifications and changes could be made thereunto without departing from the spirit and scope of the invention disclosed.

I claim:

1. A tool handle mounting structure for attaching a handle to a tool head comprising: a coupling cap having a mounting section at one end fixed to said tool head and a coupling section at an opposite end adapted for coupling to a handle, said mounting section having a stepped periphery with the steps increasing in diameter in a direction toward said coupling section, said coupling section having an external spiral groove around the periphery; a tubular front end on said handle adapted for coupling to the coupling section of said coupling cap, said tubular front end having a plurality of threads raised from an inside surface adapted for threading onto the spiral groove of the coupling section;

a longitudinal locating groove on a largest step of said mounting section;

a sleeve fixedly mounted to the tubular front end of said handle, said sleeve having a longitudinal track on an outside with a longitudinal sliding slot in said longitudinal track, said longitudinal sliding slot being longitudinally aligned with the longitudinal locating groove of said coupling cap when said handle is coupled to said coupling cap; and, a sliding lock movably mounted in the longitudinal sliding slot, so as to be movable toward and away from the locating groove of said coupling cap, such that said sliding lock is movable into the locating groove of said coupling cap to prohibit rotary motion of said sleeve and said handle relative to said coupling cap and said tool head, and movable out of the locating groove of said coupling cap to enable said sleeve and said handle to be rotated relative to said coupling cap and said tool head.

* * * * *